Patented Jan. 1, 1929.

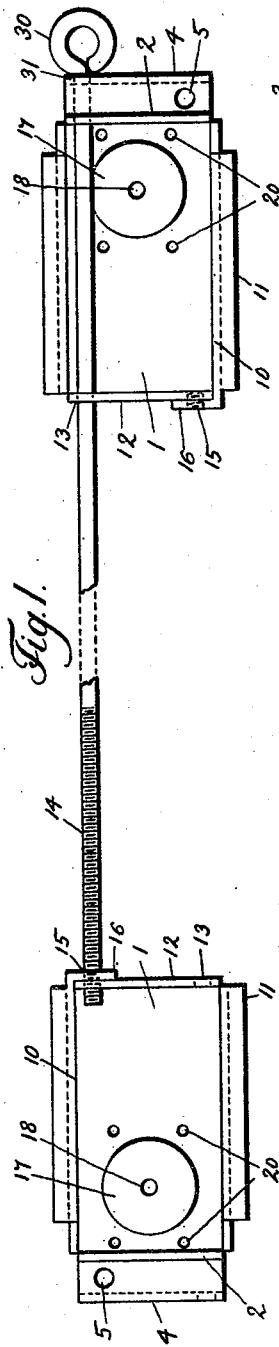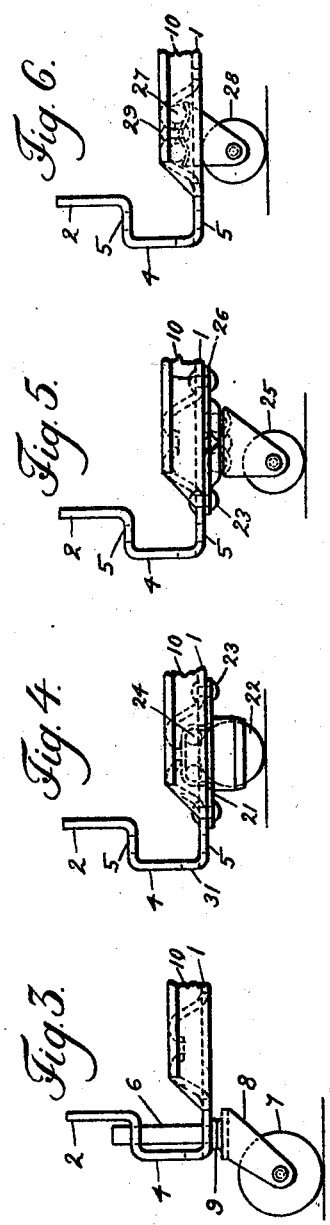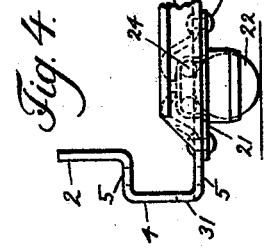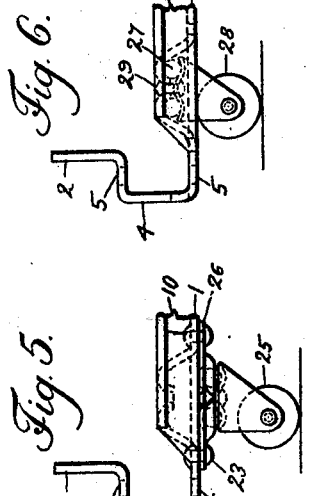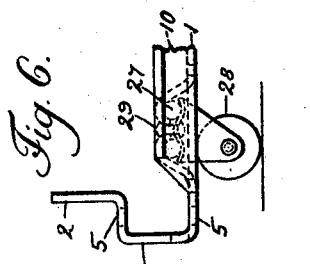

1,697,619

UNITED STATES PATENT OFFICE.

IVAN G. SVIAGENINOV, OF NEW YORK, N. Y.

CHASSIS OF A CASTER ATTACHMENT FOR TRUNKS.

Application filed October 15, 1927. Serial No. 226,388.

My invention relates to chassis for caster attachments for trunks and has a particular reference to chassis or frames adapted to be provided with casters and to be attached to trunks or similar bulky objects.

The object of my invention is to provide a chassis of a light and portable construction so designed and built that any of the ordinary types of casters can be attached to it.

There are the following standard types of casters in use:

1. Casters with a shank,
2. Casters with a flat base to be riveted or bolted,
3. Casters with a ball bearing base to be attached with a single central bolt or rivet, and
4. Ball casters provided with a flange to be riveted or bolted.

My chassis of a caster attachment is adapted to be fitted with any of the above types of casters.

My invention is more fully described in the accompanying specification and drawing in which—

Fig. 1 is a plan view of my caster chassis, Fig. 2 is an elevation of same partly in section, Fig. 3 is a detail showing the attachment of a shank type caster, Fig. 4 is a detail view showing a ball caster attachment, Fig. 5 is a view showing a caster with a flat base, and Fig. 6 is a view showing a caster similar to Fig. 5 except that it is attached with a single central rivet.

My chassis consists of members 1 which are identical in their construction. They are provided with lugs 2 adapted to engage the sides of a trunk 3 shown with dotted lines. These lugs are bent so as to form bulges 4. The upper and lower sides of these bulges are provided with apertures 5 into which a shank 6 of a caster 7 (Fig. 3) may be fitted. The caster yoke 8 rotates in a horizontal plane on a bearing 9 attached to the lower end of the shank 6.

The member 1 represents a flat piece of metal with bent up sides 10 with flanges 11 adapted to support the bottom of the trunk 3. The inner end of the member 1 is also raised or bent forming a wall 12. It has an aperture 13 on one side for a screw 14 (sliding fit) and a threaded aperture 15 at the other side for the threaded portion of the screw 14. A flap 16 is bent over the aperture 15 and is also provided with a threaded aperture registering with the aperture 15. This arrangement simply provides for a double thickness of the threaded portion in the wall 12 which is important in order to insure greater strength of same.

The bottom portion of the member 1 is provided with an inverted cup shaped depression 17 with a hole 18 at the top. A circular groove 19 is formed around the central hole 18. A number of symmetrically arranged holes 20 are located around the base of the depression 17. These holes may be used to attach a flange 21 of a ball caster 22 (Fig. 4) by means of rivets 23. The upper portion of the caster with bearings 24 fits in the depression 17. A caster 25 with a flat base 26 may be also attached to the chassis by means of rivets 23 (Fig. 5).

The groove 19 may be used for balls 27 serving as an upper ball race of a ball bearing caster 28 (Fig. 6). The lower race is formed in the upper portion of the caster yoke which is attached to the chassis by means of a single central rivet 29 fitting loosely in the yoke so that it can rotate on this rivet as on a pivot.

The two members 1 of the chassis are connected together with a screw 14 with a handle 30 extending outside of the bulge 4. A hole 31 is provided in the bulge for the screw which also passes through the hole 13 in the inner edge 12 of the member. The other end of the screw is screwed into the threaded hole 15.

The chassis is placed under the trunk so that it can rest on the flanges 10 with lugs 2 bearing against its sides and the screw is turned until the sides of the trunk are firmly clamped between the lugs 2. It is understood, of course, that the chassis is already provided with one of the ordinary types of casters.

Important advantages of my caster chassis are that it can be provided with any of the standard types of casters, is light and portable, so that it can be carried in the trunk with the clamping screw removed, is simple to manufacture, both clamping members being identical in construction, and it can be conveniently operated from the outside, the screw head extending outside of the clamping member.

I claim as my invention:

In a chassis for caster attachments for trunks, the combination with two clamping members, of a screw adjustably connecting said members, said members being made from sheet metal, the ends of said members being provided with lugs, bilges on said lugs with holes in their upper and lower portions for casters with vertical stems, and depressed seats in the horizontal portions of said members for casters with flat bases.

Signed at New York, in the county of New York and State of New York, this 13th day of Oct. A. D. 1927.

IVAN G. SVIAGENINOV.